(12) United States Patent
Pazhyannur et al.

(10) Patent No.: US 11,855,841 B2
(45) Date of Patent: *Dec. 26, 2023

(54) CREATING A USER PRIVATE NETWORK BASED ON 802.11AY WI-FI TECHNOLOGY

(71) Applicant: Cisco Technology, Inc., San Jose, CA (US)

(72) Inventors: Rajesh S. Pazhyannur, Fremont, CA (US); Anand Oswal, Pleasanton, CA (US); Arun G. Khanna, Sunnyvale, CA (US); Kedar K. Gaonkar, San Jose, CA (US); Shree N. Murthy, San Jose, CA (US); Sudhir Jain, Fremont, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/722,798

(22) Filed: Apr. 18, 2022

(65) Prior Publication Data
US 2022/0247627 A1   Aug. 4, 2022

Related U.S. Application Data

(63) Continuation of application No. 16/878,106, filed on May 19, 2020, now Pat. No. 11,310,105.

(60) Provisional application No. 62/914,177, filed on Oct. 11, 2019.

(51) Int. Cl.
*H04W 12/06* (2021.01)
*H04L 41/0806* (2022.01)
*H04W 76/10* (2018.01)
*H04W 4/029* (2018.01)
*H04W 84/12* (2009.01)

(52) U.S. Cl.
CPC ......... *H04L 41/0806* (2013.01); *H04W 4/029* (2018.02); *H04W 76/10* (2018.02); *H04W 84/12* (2013.01)

(58) Field of Classification Search
CPC .. H04L 41/0806; H04W 4/029; H04W 76/10; H04W 84/12; H04W 12/06
See application file for complete search history.

(56) References Cited

U.S. PATENT DOCUMENTS

9,155,030 B2   10/2015   Chhabra
9,979,452 B2   5/2018    Park
10,284,382 B2  5/2019    Anka
(Continued)

*Primary Examiner* — Joseph E Dean, Jr.
(74) *Attorney, Agent, or Firm* — Baker Botts L.L.P.

(57) ABSTRACT

Certain embodiments disclose systems and methods for creating a user private network (UPN) based on 11ay technology. Methods of the present disclosure include creating a personal basic service set (PBSS) having a service device and one or more 11ay devices, the service device configured to wirelessly communicate with the one or more 11ay devices in the PBSS, creating a UPN having an access point located in communicative proximity with the service device, and associating at least one 11ay device of the one or more 11ay devices with the UPN, wherein the at least one 11ay device is configured to establish a wireless connection with the one or more 11ay devices using the service device when within a coverage area of the PBSS, and to establish a wireless connection with the one or more 11ay devices using the access point when outside the coverage area of the PBSS.

20 Claims, 4 Drawing Sheets

(56) References Cited

U.S. PATENT DOCUMENTS

| | | | |
|---|---|---|---|
| 11,310,105 B2* | 4/2022 | Pazhyannur | .......... H04W 76/10 |
| 2017/0302349 A1 | 10/2017 | Sun | |
| 2019/0007964 A1 | 1/2019 | Park | |

* cited by examiner

CREATING A USER PRIVATE NETWORK BASED ON 802.11AY WI-FI TECHNOLOGY

CROSS-REFERENCE TO RELATED APPLICATIONS

This application claims priority to and the benefit of U.S. Provisional Application No. 62/914,177, filed on Oct. 11, 2019, which application is incorporated herein by reference in its entirety.

PRIORITY

This application is a continuation, under 35 U.S.C. § 120, of U.S. patent application Ser. No. 16/878,106 filed on May 19, 2020, which claims priority to U.S. Provisional Patent Application No. 62/914,177 filed Oct. 11, 2019, each of which is hereby incorporated by reference in their entirety.

TECHNICAL FIELD

The present disclosure generally relates to 802.11ay Wi-Fi technology, and more specifically to systems and methods for creating a user private network based on 802.11ay Wi-Fi technology.

BACKGROUND

Wireless networking, also called Wi-Fi or 802.11 networking, uses radio signals to wirelessly connect devices such as computers, phones, and tablets to the Internet at high speeds in homes, businesses, and public spaces. IEEE wireless standard 802.11ax (referred to herein as "11ax") is marketed as Wi-Fi 6 and is one of the next mainstream Wi-Fi protocols in Wi-Fi technology. Another wireless standard is 802.11ay ("11ay"). While 11ax operates at low frequency bands, such as the 2.4 GHz and 5 GHz bands, and can penetrate walls and other physical barriers, 11ay operates at the higher 60 GHz band, and cannot effectively penetrate walls.

DESCRIPTION OF EXAMPLE EMBODIMENTS

Overview

According to an embodiment, a system may include one or more processors and one or more computer-readable non-transitory storage media comprising instructions that, when executed by the one or more processors, cause one or more components of the system to perform operations including, creating a personal basic service set (PBSS) associated with a service device and one or more 11ay devices, the service device configured to enable wireless communication with and among the one or more 11ay devices in the PBSS, creating, via the service device, a user private network (UPN) associated with at least one access point located in communicative proximity with the service device, and associating at least one 11ay device of the one or more 11ay devices with the UPN, wherein the at least one 11ay device is configured to establish a first wireless connection with the one or more 11ay devices using the service device when within a coverage area of the PBSS, and to establish a second wireless connection with the one or more 11ay devices using the at least one access point when outside the coverage area of the PBSS.

Moreover, the service device may maintain a first registry of the one or more 11ay devices associated with the PBSS, including credentials relating to each of the one or more 11ay devices.

Additionally, the operation of associating may include determining that the at least one 11ay device has been selected for association with the UPN. The operation of associating may further include automatically registering the selected at least one 11ay device with a UPN server associated with the UPN.

Moreover, the UPN server may maintain a second registry of the at least one 11ay device associated with the UPN.

Additionally, the operations may also include modifying the UPN by adding one or more new 11ay devices. The operation of modifying may also include identifying the one or more new 11ay devices associated with the PBSS to be added to the UPN, the one or more new 11ay devices registered with the first registry of the service device, and syncing the first registry of the service device with the second registry of the UPN server.

According to another embodiment, a method may include the steps of creating a personal basic service set (PBSS) associated with a service device and one or more 11ay devices, the service device configured to enable wireless communication with and among the one or more 11ay devices in the PBSS, creating, via the service device, a user private network (UPN) associated with at least one access point located in communicative proximity with the service device, and associating at least one 11ay device of the one or more 11ay devices with the UPN, wherein the at least one 11ay device is configured to establish a first wireless connection with the one or more 11ay devices using the service device when within a coverage area of the PBSS, and to establish a second wireless connection with the one or more 11ay devices using the at least one access point when outside the coverage area of the PBSS.

According to yet another embodiment, one or more computer-readable non-transitory storage media may embody instructions that, when executed by a processor, cause the performance of operations, including creating a personal basic service set (PBSS) associated with a service device and one or more 11ay devices, the service device configured to enable wireless communication with and among the one or more 11ay devices in the PBSS, creating, via the service device, a user private network (UPN) associated with at least one access point located in communicative proximity with the service device, and associating at least one 11ay device of the one or more 11ay devices with the UPN, wherein the at least one 11ay device is configured to establish a first wireless connection with the one or more 11ay devices using the service device when within a coverage area of the PBSS, and to establish a second wireless connection with the one or more 11ay devices using the at least one access point when outside the coverage area of the PBSS.

Technical advantages of certain embodiments of this disclosure may include one or more of the following. The systems and methods described herein may allow for an automated approach for device onboarding and the dynamic creation of a user private network based on the location and proximity of a device to a wireless access point or service device by leveraging the 802.11ay standard. More specifically, the systems and methods of the present disclosure may allow a user to create a PBSS in association with a service device, wherein the PBSS may include one or more 11ay devices. Then, the user may extend the PBSS to a UPN in association with an access point, so that any of the 11ay devices of the PBSS may establish a wireless connection with the other 11ay devices using the service device when within a coverage area of the PBSS, and establish a wireless connection with the other 11ay devices using the access point when outside the coverage area of the PBSS. The extension of the PBSS to the UPN may be in a dorm room, classroom, auditorium, hospital, or any other shared environment.

Other technical advantages will be readily apparent to one skilled in the art from the following figures, descriptions, and claims. Moreover, while specific advantages have been enumerated above, various embodiments may include all, some, or none of the enumerated advantages.

EXAMPLE EMBODIMENTS

Most homes, businesses, and enterprises use Wi-Fi technology (such as flax) to enable wireless devices to connect to the Internet. A Wi-Fi connection may be established through an access point, which is a hardware device or configured node on a local area network (LAN) that allows wireless capable devices and wired networks to connect through a wireless standard, including Wi-Fi. An access point may be mounted on a ceiling and may enable wireless coverage of up to 150 feet indoors and 300 feet outdoors.

A new Wi-Fi standard called 11ay (or sometimes called "Wi-Gig") is a companion technology to 11ax and is the next generation of Wi-Fi technology. 11ay operates on a higher 60 GHz frequency, has a transmission rate of 20-40 Gbps, and provides coverage of up to 1000 feet. 11ay is less affected by weather than the 2.4 GHz and 5 GHz frequencies of 11ax and attenuates rapidly through atmospheric gasses. However, because of the physics of the 60 GHz band, 11ay is limited by physical boundaries, such as walls, furniture and glass, and requires a clear line of sight between the wireless device and the associated access point.

11ay wireless local area networking standards allow for the creation of a Personal Basic Service Set (PBSS) (also known as Basic Service Set (BSS)). A PBSS is a group of devices that operate with the same physical layer medium access characteristics, e.g., radio frequency, modulation scheme, security settings, etc., and are wirelessly networked together. By way of example, in a university setting, a student user may have a cell phone, a printer, a smart television, and/or other Wi-Fi enabled devices in his/her dorm room. The user may enable an operation mode on one or more of these devices to create a PBSS. In this mode, a selected device may either operate as a Wi-Fi client or as a Wi-Fi access point. When operating as an access point, the device is called a personal control point (PCP) or more generally, a "service device". The present disclosure will hereafter refer to PBSS access points as service devices. The service device may allow the user to group together his/her devices that are in the dorm room to create a PBSS, thereby enabling wireless communication between the devices. However, when a given device (e.g., the cell phone) moves outside the coverage area of the PBSS network (e.g., outside the dorm room), the device may lose its ability to communicate with the remaining devices in the PBSS. For example, in a dorm room setting, the cell phone may be precluded from communicating with the printer to initiate a printing action. Thus, there is a need to extend PBSS capability beyond the coverage area of the PBSS network.

The present disclosure describes systems and methods for extending a PBSS network by creating a user private network (UPN), thereby allowing continued communication between devices of a PBSS even when a given device moves outside the coverage area of the PBSS. In one embodiment, a PBSS may be used to create a UPN. In another embodiment, a UPN may be used to create a PBSS. Each of these will be described more fully below.

Figure 1:
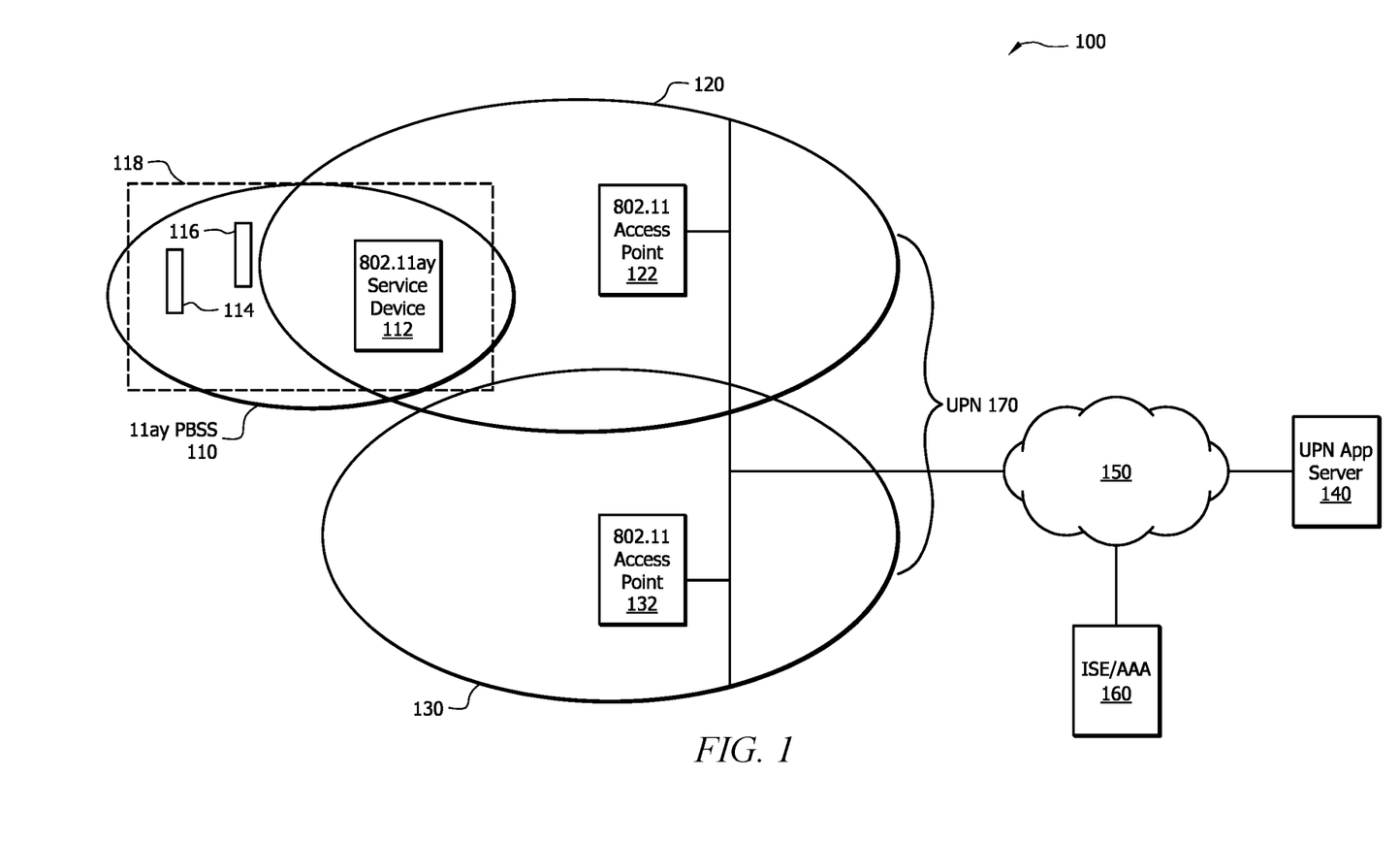
FIG. 1 illustrates a system for creating a user private network based on a 11ay personal basic service set, in accordance with certain embodiments.

FIG. 1 depicts a system 100 for creating a UPN based on a 11ay PBSS. System 100 includes a 11ay-enabled device which may serve as a PCP or service device 112. The service device 112 may comprise a smart phone, a wireless display, a printer, a streaming device, or any other 11ay-enabled device. The system 100 further includes one or more 11ay client devices 114, 116 (hereinafter simply referred to as "11ay devices"), which may wirelessly connect to the network through service device 112. This subset of one or more 11ay devices 114, 116 and the service device 112 constitutes a PBSS 110, wherein the one or more 11ay devices 114, 116 may communicate with the service device 112 and with each other through the network. The coverage area of the PBSS 110 is based on the range of the service device 112. In FIG. 1, the coverage area of the PBSS is delineated by the oval forming the boundary of PBSS 110, and substantially corresponds to the physical room 118 in which the service device 112 is located. Physical room 118 may constitute, by way of example, a dorm room in a university, a classroom in a school, a hospital room in a hospital facility, etc.

System 100 may further comprise one or more access points 122, 132 which may provide wireless network connectivity for the user to the network. In an embodiment, access points 122, 132 may comprise 11ax access points operating based on 11ax Wi-Fi technology. In another embodiment, access points 122, 132 may be operating based on 802.11ac Wi-Fi technology or any another Wi-Fi technology known in the art. For purposes of illustration only, the present disclosure may refer to access point 122 and access point 132 as "802.11 access points" or simply "access points", but it is to be understood that access points 122 and 132 may be associated with any Wi-Fi technology. Access point 122 may correspond to a first coverage area 120, and access point 132 may correspond to a second coverage area 130. The access points 122, 132 defined by coverage areas 120, 130, may be registered with a UPN application server 140 to form UPN 170. While two access points 122, 132 are shown and described in conjunction with FIG. 1, it is to be understood that system 100 may include any number of access points.

As shown in FIG. 1, at least one access point 122 may be in communicative proximity (i.e., within sufficient range so as to communicate) with the service device 112. In an embodiment, the first coverage area of the access point 122 may overlap with the coverage area of the service device 112 (shown by the oval boundary of the PBSS 110). By way of example, if the service device 112 is located in a physical room 118 (such as a dorm room), the access point 122 may be located in a hallway outside of the physical room 118. The proximity of the service device 112 of PBSS 110, and more specifically, the communicative range of the service device 112, to the access point 122 may enable the extension of the PBSS 110 to the UPN 170.

In an embodiment, the coverage area of UPN 170 may correspond to the cumulative coverage areas 120, 130 of the one or more access points 122, 132. Moreover, although the coverage area of access point 132 does not overlap with the coverage area of the PBSS 110, access point 132 may be able to communicate with service device 112 via access point 122, as described more fully below.

System 100 may further include a UPN application server 140 and an identity services engine (ISE) 160, which may each communicate with the service device 112 and/or the access points 122, 132 via the cloud 150. UNP application server 140 may be communicatively coupled and/or associated with UPN 170, as well access points 122, 132. ISE 160 may comprise a module having authentication, authorization, and accounting (AAA) capabilities. As known and understood by those of skill in the art, AAA capabilities may help secure the wireless network against unauthorized access.

In operation, a user may create a PBSS 110 associated with a 11ay device which acts as a service device 112 and one or more other 11ay devices 114, 116, wherein the service device 112 is configured to enable wireless communication with and among the one or more 11ay devices 114, 116 in the PBSS 110. In an embodiment, the user may first designate a specific 11ay device as a service device 112, and then may associate one or more other 11ay devices 114, 116—that are within the wireless coverage area of the service device 112 (e.g., that are in the physical room 118 or in proximity with the service device 112)—with the service device 112 to create a PBSS 110. In an embodiment, any of the 11ay devices 114, 116 may also be designated as a service device. The service device 112 may serve as an access point for the PBSS 110, and may be configured to enable wireless communication with and among the 11ay devices which are currently in or will be added to the PBSS 110.

The service device 112 may maintain a first registry of the one or more 11ay devices 114, 116 associated with the PBSS 110, including the credentials associated with each 11ay device 114, 116. Credentials may include the MAC address, device name, device type, and the like of each 11ay device 114, 116.

As described above, the PBSS 110 may be associated with a defined coverage area (shown by the oval which forms PBSS 110). The one or more 11ay devices 114, 116 may wirelessly communicate with one other and with the service device 112 so long as they remain within the defined coverage area of the PBSS 110. When a given 11ay device (for example, 11ay device 114) moves outside the coverage area of the PBSS 110, it may not (in the absence of an extension to the PBSS 110, as described below) be able to maintain its wireless connection with the service device 112 or the other 11ay device(s) 116 in the PBSS 110.

In accordance with the present disclosure, the user may utilize a user private network (UPN) 170 to extend the PBSS 110, so that when a given 11ay device 114 moves outside the coverage area of the PBSS 110, it may continue to wirelessly communicate with the service device 112 and the other 11ay device(s) 116 in the PBSS 110 through the UPN 170. The UPN 170 may be created via the service device 112 and may be associated with one or more access points 122, 132, at least one of which is located in communicative proximity to the service device 112.

In an embodiment, the UPN 170 may be created in accordance with the following steps. First, the user may connect to the service device 112. The service device 112 may provide to the user a list of all 11ay devices 114, 116 currently connected and/or connected within the last 24 hours to the PBSS 110. The service device 112 may also provide the credentials of each connected 11ay device 114, 116. The list of 11ay devices 114, 116 and their associated credentials would be stored in the first registry of the service device 112. The service device 112 may then prompt the user to initiate the creation of a UPN and may require the user to provide certain UPN credentials, such as the name of the UPN, URL of UPN server, and the like. The user may then select the 11ay devices 114, 116 which he/she desires to add to the UPN based on the list provided by the service device 112. Once the user provides these inputs (UPN credentials, selection of the devices to add to the UPN), the service device 112 may proceed to create the UPN 170 The UPN 170 will be associated with all access points 122, 132 of the system 100. As such, once the UPN 170 is created, the 11ay devices 114, 116 that are selected to join (i.e., be associated with) the UPN 170 may communicate with each other and the service device 112 using any access point 122, 132 of the system 100.

To create the UPN 170, the service device 112 may use an application programming interface (API) to securely connect to the UPN application server 140, and provide the UPN credentials to the UPN application server 140. In an embodiment, the API may comprise a UPN Representational State Transfer API ("UPN REST API").

Once the UPN 170 has been created, the service device 112 may associate (by adding) the selected 11ay devices 114, 116 to the UPN 170. By associating (adding) the 11ay devices 114, 116 to the UPN 170, the service device 112 may provide the information and credentials relating to the selected 11ay devices 114, 116 to the UPN server 140, which may then automatically register all of the selected 11ay devices 114, 116 on the UPN server 140. In an embodiment, the UPN server 140 may maintain a second registry of the 11ay devices 114, 116 that are associated with the UPN 170. The UPN application server 140 will also create access policies relating to the associations, and push the policies to ISE 160. ISE 160 will then enforce the policies.

Once the 11ay devices 114, 116 are connected to the UPN 170, a given 11ay device 114 may establish a wireless connection with one or more 11ay devices 112, 116 using the service device 112 when it is in the coverage area of the PBSS 110, and may establish a wireless connection with one or more 11ay devices 112, 116 using one of the access points 122, 132 when it is outside the coverage area of the PBSS 110 (as long as it stays within the coverage area of the access points 122, 132, i.e., the coverage area of the UPN 170). Specifically, if 11ay device 114 moves outside the coverage area of the PBSS 110 and remains in the coverage area of one of the access points 122, 123 (such as access point 122), which is also within coverage of the UPN 170, and desires to establish a connection with another 11ay device 116 in the PBSS 110, the UPN application server 140 will: 1) recognize the 11ay device 114 (since it has been registered with the UPN application server 140); and 2) validate the requested communication between 11ay device 114 and 11ay device 116; and 3) establish the wireless connection from the access point 122 of UPN 170 to the service device 112 of PBSS 110 to the desired 11ay device 116.

In an embodiment, the UPN 170 may be modified when one or more new 11ay devices (not shown) are added to the PBSS 110. As described above, the service device 112 may maintain a first registry of the 11ay devices 114, 116 that are associated with the PBSS 110. Each time a new device is added to the PBSS 110, the first registry of the service device 112 may be updated to reflect the addition of new 11ay devices. The service device 112 may periodically prompt the user to select the one or more new 11ay devices that appear within the PBSS 110 for addition to the UPN 170. If one or more new 11ay devices are selected by the user for addition to the UPN 170, the service device 112 may identify the selected new 11ay devices and may synchronize its first registry with the second registry of the UPN application server 140. Once the synchronization is complete, the new 11ay devices may be associated with (added to) the UPN 170. In an embodiment, the addition of new devices to the UPN 170 may be automated (wherein new devices identified by the PBSS 110 are automatically added to the UPN 170 without user input).

In another embodiment, any devices inside the range of the PBSS 110 which are not capable of 11ay (e.g., devices which are only capable of 11ax, 11ac, or another Wi-Fi technology) may establish a wireless connection using the access point 122.

Additionally, although system 100 has been described in connection with extending a PBSS 110 to a UPN 170 where at least one access point 122 is located in communicative proximity to the service device 112 (wherein the coverage area of the PBSS 110 overlaps with the coverage area 120 of the at least one access point 122), it is to be understood that the resulting UPN 170 is associated with all access points 122, 132 of the system 100, and the PBSS is therefore extended to the coverage areas of all of these access points 122, 132. In other words, PBSS 110 may be extended to the coverage area of access point 132, even if such access point 132 is not within physical proximity to the service device 112. Thus, when an 11ay device 114 moves outside the coverage area of the PBSS 110 and into the coverage area of the access point 132 and desires to establish a connection with another 11ay device 116 in the PBSS 110, the UPN application server will: 1) recognize the 11ay device 114 (since it has been registered with the UPN application server 140); and 2) validate the requested communication between 11ay device 114 and 11ay device 116; and 3) establish the wireless connection from access point 132 to access point 122 (which are part of the same UPN 170) to the service device 112 of PBSS 110 to the desired 11ay device 116.

In sum, the system 100 described above allows for the extension of a PBSS 110 based on the creation of a UPN 170. In some embodiments, the present disclosure may also contemplate the reverse operation, i.e., leveraging an existing UPN to create and manage a PBSS. According to this embodiment, a 11ay device capable of serving as a service device 112 may first be identified. The service device 112 must have connectivity to the UPN application server 140 either via a 11ax-based connection or a cellular connection. One or more 11ay devices 114, 116 capable of joining a PBSS may also be identified. All of the identified 11ay devices 112, 114, 116 may be part of an existing UPN 170.

The service device 112 may establish a transport layer security (TLS) connection with the UPN application server 140. The TLS connection may be based on IP address or other credentials, and the UPN application server 140 may correlate the TLS connection with an owner of the UPN group 170. Specifically, as part of the secure TLS connection, the UPN application server may identify the service device 112 as belonging to a particular user and as part of a particular UPN 170.

Next, a 11ay device 114 (which does not operate as a service device 112) may discover and associate with the service device 112. The 11ay device 114 may initiate a 802.1X authentication. A 802.1X authentication is an IEEE standard for port-based Network Access Control, and provides an authentication mechanism for devices wishing to connect with other devices on a LAN or wireless LAN. The service device 112 may encapsulate an extensible authentication protocol (EAP) message over the TLC connection. The UPN application server 140 may determine whether the 11ay device 114 is authenticated by checking its credentials (e.g., user ID, MAC address, certificate, etc.) If authentication of the 11ay device 114 is confirmed, the UPN application server 140 may encapsulate an EAP message in Remote Authentication Dial In User Service (RADIUS) and communicate it with the ISE/AAA server. ISE may authenticate the user, and on successful authentication, may generate a key, send it to the service device 112, which in turn uses the key to generate other keys for encrypting traffic to/from hay device 114. As known in the art, RADIUS technology is used to authenticate and authorize users to Wi-Fi networks. In this case, the EAP message in RADIUS may allow the system to push the credentials of the 11ay device 114 to the 11ay network and transmit all messages needed to authenticate the user, and to thereby enable the UPN 170 to connect to the PBSS 110. Based on the end to end message sent over the combination of RADIUS, TLS, EAPOL/11ay, and any other authentication means known in the art, security credentials between the 11ay device 114 and the service device 112 may be established, and a PBSS 110 may be created.

Figure 2:
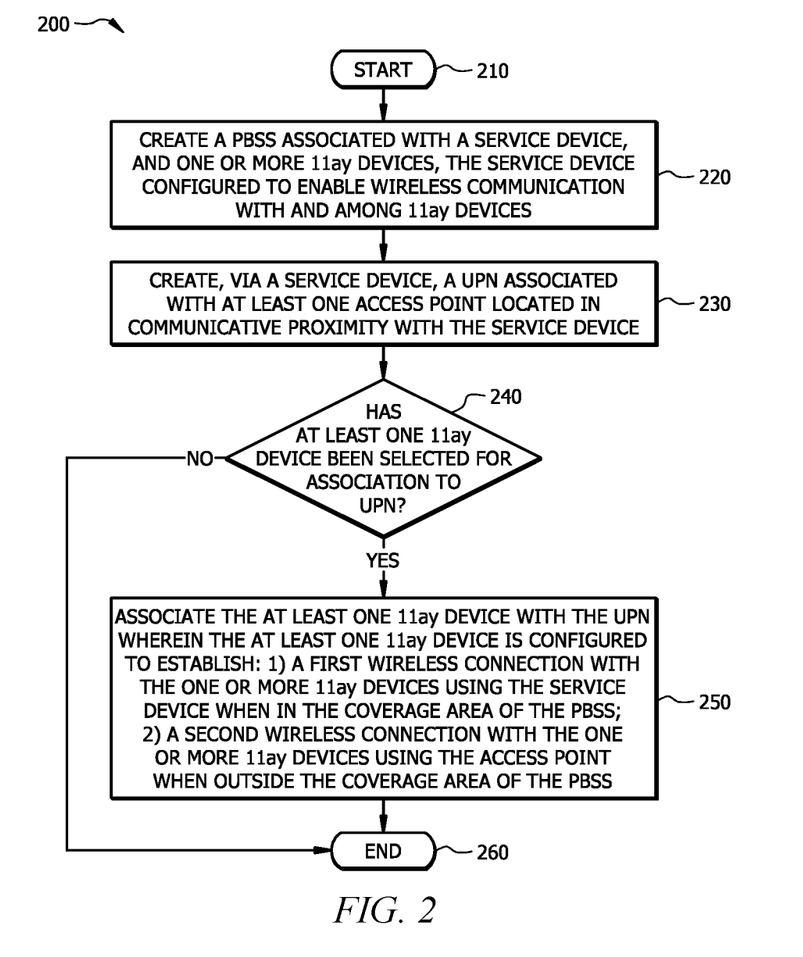
FIG. 2 illustrates a flow diagram of a method for creating a user private network based on a 11ay personal basic service set, in accordance with certain embodiments.

Reference is now made to FIG. 2, wherein is shown a method 200 for creating a user private network based on a personal basic service set, according the present disclosure. It is to be understood that the terms and concepts of method 200 may correspond to the terms and concepts described in operation of system 100 described in conjunction with FIG. 1. The method may begin at step 210. At step 220, a PBSS may be created, wherein the PBSS is associated with a 11ay service device (referred to as a "service device") and one or more 11ay devices, wherein the service device is configured to enable wireless communication with and among the one or more 11ay devices in the PBSS. In an embodiment, to create the PBSS in accordance with step 220, an 11ay-enabled device may be designated as a service device. Then, one or more 11ay client devices (also referred to as 11ay devices) that are within the coverage area of the service device may be associated with the service device to create the PBSS. In an embodiment, any of the one or more 11ay devices may also be designated as a service device. The service device may serve as an access point for the PBSS, and may be configured to enable wireless communication with and among the 11ay devices which are currently in or will be added to the PBSS.

The service device may maintain a first registry of the one or more 11ay devices associated with the PBSS, including credentials relating to each of the one or more 11ay devices. Credentials may include, by way of example, the MAC address, the device name, the device type, and the like.

The PBSS created in step 220 may be associated with a defined coverage area. In other words, the service device and the one or more 11ay devices may be able to wirelessly communicate with each other so long as they remain within the defined coverage area of the PBSS. When a given 11ay device (from the one or more 11ay devices) goes outside the defined coverage area, it may no longer be able to maintain its wireless connection with the other 11ay devices in the PBSS, without establishing a UPN, as described below.

At step 230, a UPN may be created by the service device, wherein the UPN is associated with at least one access point. In an embodiment, the at least one access point may comprise an 11ax access point operating based on 11ax Wi-Fi technology. In another embodiment, the at least one access point may be operating based on 802.11ac Wi-Fi technology or any another Wi-Fi technology known in the art. The at least one access point may be located in communicative proximity (within sufficient range so as to communicate) with the service device. In other words, the at least one access point may be within a predetermined range of the service device to enable communication between the two devices. In an embodiment, the at least one access point may be determined to be in communicative proximity with the service device if a coverage area of the at least one access point overlaps with the coverage area of the service device. The communicative proximity of the service device to the access point may enable the extension of the PBSS network to the UPN, as described below. It is to be understood that while method 200 describes at least one access point located in communicative proximity to the service device, it is to be understood that the present disclosure contemplates any number of access points in conjunction with method 200.

In an embodiment, the UPN may be created in accordance with the following steps. First, a user may connect to the service device. The service device may provide to the user a list of the one or more 11ay devices currently connected and/or connected within the last 24 hours to the PBSS. The service device may also provide the credentials of each of the one or more 11ay devices. The service device may prompt the user to initiate the creation of a UPN and may require the user to provide certain credentials, such as the name of the UPN, URL of UPN server, and the like. The user may then select at least one 11ay device from the one or more 11ay devices for addition to the UPN based on the list provided by the service device. Once the user provides these inputs (UPN credentials, selection of the at least one 11ay device to add to the UPN), the service device may proceed to create the UPN. Specifically, using an application programming interface (API), the service device may securely connect to a UPN application server and provide credentials to create the UPN. In an embodiment, the API may comprise a UPN REST API. The UPN will be associated with the at least one access point. As such, once the UPN is created, the at least one 11ay device that is selected to join (i.e., be associated with) the UPN may communicate with one or more other 11ay devices and the service device using the at least one access point.

At step 240, a determination is made as to whether at least one 11ay device from the one or more 11ay devices of the PBSS has been selected for association with (or addition to) the UPN. If, at step 240, a determination is made that at least one 11ay device from the one or more devices 11ay devices of the PBSS has not been selected for association with (or addition to) the UPN, the method may end at step 260. If, however, at step 240, a determination is made that at least one 11ay device from the one or more devices 11ay devices of the PBSS has been selected for association with (or addition to) the UPN, the method may proceed to step 250, wherein the at least one device is associated with (or added to) the UPN.

In an embodiment, the step 250 of associating may include the service device providing the information and credentials relating to the at least one 11ay device selected for association with the UPN to the UPN server, which may then may then automatically register the selected at least one 11ay device on the UPN server. In an embodiment, the UPN server may maintain a second registry of the at least one 11ay device associated with the UPN.

Once the at least one 11ay device is associated with the UPN, the at least one device may be configured to establish a (first) wireless connection with the one or more 11ay devices using the service device when in a coverage area of the PBSS, and to establish a (second) wireless connection with the one or more 11ay devices using the at least one access point when outside the coverage of the PBSS. Specifically, if the at least one 11ay device moves outside the coverage area of the PBSS and into the coverage area of the UPN, and desires to establish a connection with one or more 11ay devices in the PBSS, the UPN application server will: 1) recognize the at least one 11ay device (since it has been registered with the UPN application server); and 2) validate the requested communication between the at least one 11ay device and the one or more 11ay devices; and 3) establish the wireless connection from the at least one access point of the UPN to the service device of the PBSS to the desired one or more 11ay devices.

In some embodiments, once a UPN is created, it may modified by adding new devices which may have joined the PBSS. Specifically, because the service device keeps track of the PBSS and its associated devices, as well as the UPN and its associated devices, when a new device is added to the PBSS, it will track it as a device not added to the UPN. A user may, upon connecting to the service device, simply update the UPN so that all devices added to the PBSS since the last connection would be added to the UPN using the REST API.

In sum, the method 200 of the present disclosure may allow for extension of PBSS capability when a 11ay device is outside of the coverage area of the PBSS by extending the PBSS scope using a UPN.

Figure 3:
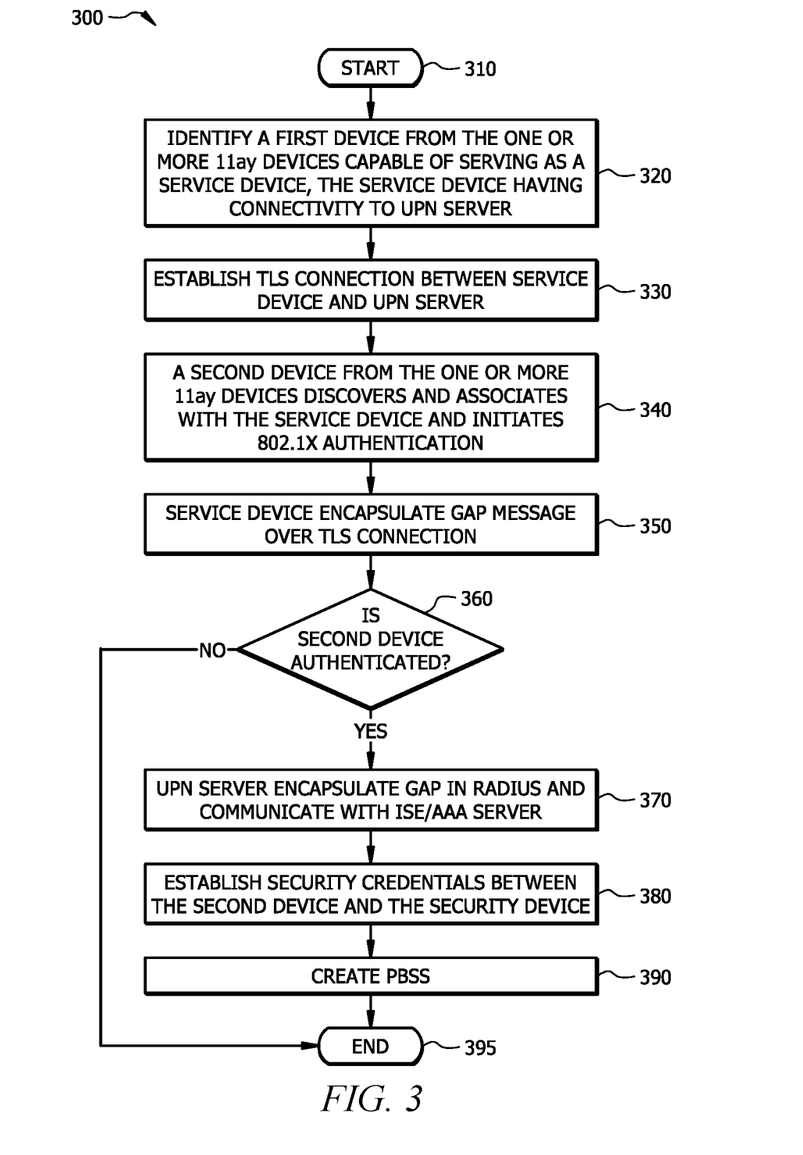
FIG. 3 illustrates a flow diagram of a method for creating a 11ay personal basic service set based on a user private network, in accordance with certain embodiments.

Reference is now made to FIG. 3, wherein is shown a method 300 for creating a PBSS based on a UPN. According method 300, one or more 11ay devices capable of joining a PBSS may be identified. All of the identified one or more 11ay devices may be part of an existing UPN.

The method may begin at step 310. At step 320, a first device from the one or more 11ay devices capable of serving as a service device may be identified, the first device (i.e., the service device) having connectivity to a UPN application server. Connectivity to the UPN application server may be via a 11ax-based connection or a cellular connection. At step 330, a TLS connection may be established between the service device and the UPN application server. The TLS connection may be based on IP address or other credentials, and the UPN application server may correlate the TLS connection with an owner of the UPN group. Specifically, as part of the secure TLS connection, the UPN application server may identify the service device as belonging to a particular user and as part of a particular UPN.

At step 340, a second device from the one or more 11ay devices (i.e., the second device is not the service device) may discover and associate with the service device and initiate a 802.1X authentication. A 802.1X authentication is an IEEE standard for port-based Network Access Control, and provides an authentication mechanism for devices wishing to connect with other devices on a LAN or wireless LAN. At step 350, the service device may encapsulate an EAP message over the TLS connection.

At step 360, a determination is made as to whether the second device is authorized based on its credentials (e.g., user ID, MAC address, certificate, etc.). If, at step 360, a determination is made that the second device is not authorized, the method may end at step 395. If, however, at step 360, it is determined that the second device is authorized, the method may proceed to step 370, wherein the UPN server may encapsulate EAP in RADIUS and communicate it with the ISE/AAA server to push the credentials to 11ay, and to thereby enable the UPN to connect to the PBSS. At step 380, security credentials may be established between the second device and the service device. At step 390, the PBSS may be created. The method may end at step 395.

It is to be understood that while step 3220 of method 300 describes identification of a single service device from the one or more 11ay devices, any number of the one or more 11ay devices may be capable of serving as a service device. Likewise, while step 340 of method 300 describes a single second device discovering and associating with the service device, it is to be understood that any number of the one or more 11ay devices may discover and associate with the service device.

The systems and methods of the present disclosure may be beneficial in a variety of use cases. For example, it may be useful to extend a PBSS network to a UPN in a university setting. An extended private network may be desired to encompass multiple devices in a student dorm room or in a classroom. For example, using the systems and method described herein, a student or teacher may add or remove sharing privileges with respect to his/her devices in a given dorm room or classroom. In a hospital setting, the systems and methods of the present disclosure may allow medical professionals to share images (such as X-rays, MRIs, etc.) which are only pertinent to a patient in the given room. It is to be understood that the present disclosure may be applicable to any scenario requiring personalized networks with a plurality of user devices.

Figure 4:
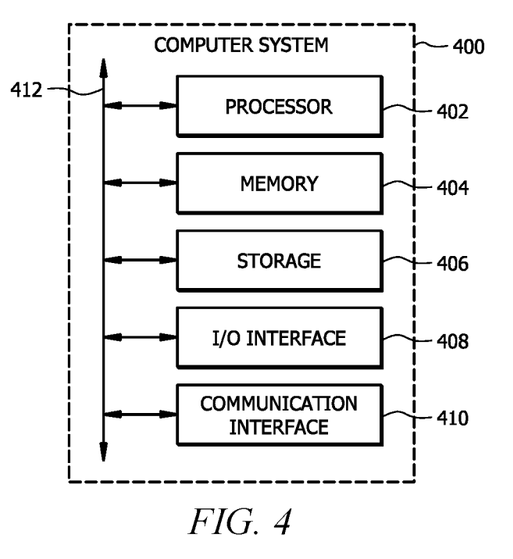
FIG. 4 illustrates a computer system, in accordance with certain embodiments.

Reference is now made to FIG. 4, wherein is shown an example computer system 400. In particular embodiments, one or more computer systems 400 perform one or more steps of one or more methods described or illustrated herein. In particular embodiments, one or more computer systems 400 provide functionality described or illustrated herein. In particular embodiments, software running on one or more computer systems 400 performs one or more steps of one or more methods described or illustrated herein or provides functionality described or illustrated herein. Particular embodiments include one or more portions of one or more computer systems 400. Herein, reference to a computer system may encompass a computing device, and vice versa, where appropriate. Moreover, reference to a computer system may encompass one or more computer systems, where appropriate.

This disclosure contemplates any suitable number of computer systems 400. This disclosure contemplates computer system 400 taking any suitable physical form. As example and not by way of limitation, computer system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 400 may include one or more computer systems 400; be unitary or distributed; span multiple locations; span multiple machines; span multiple data centers; or reside in a cloud, which may include one or more cloud components in one or more networks. Where appropriate, one or more computer systems 400 may perform without substantial spatial or temporal limitation one or more steps of one or more methods described or illustrated herein. As an example and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

In particular embodiments, computer system 400 includes a processor 402, memory 404, storage 406, an input/output (I/O) interface 408, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 402 includes hardware for executing instructions, such as those making up a computer program. As an example and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. This disclosure contemplates processor 402 including any suitable number of any suitable internal caches, where appropriate. As an example and not by way of limitation, processor 402 may include one or more instruction caches, one or more data caches, and one or more translation lookaside buffers (TLBs). Instructions in the instruction caches may be copies of instructions in memory 404 or storage 406, and the instruction caches may speed up retrieval of those instructions by processor 402. Data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches may speed up read or write operations by processor 402. The TLBs may speed up virtual-address translation for processor 402. In particular embodiments, processor 402 may include one or more internal registers for data, instructions, or addresses. This disclosure contemplates processor 402 including any suitable number of any suitable internal registers, where appropriate. Where appropriate, processor 402 may include one or more arithmetic logic units (ALUs); be a multi-core processor; or include one or more processors 402. Although this disclosure describes and illustrates a particular processor, this disclosure contemplates any suitable processor.

In particular embodiments, memory 404 includes main memory for storing instructions for processor 402 to execute or data for processor 402 to operate on. As an example and not by way of limitation, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. In particular embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere). One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 404 may include one or more memories 404, where appropriate. Although this disclosure describes and illustrates particular memory, this disclosure contemplates any suitable memory.

In particular embodiments, storage 406 includes mass storage for data or instructions. As an example and not by way of limitation, storage 406 may include a hard disk drive (HDD), a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 400, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Where appropriate, storage 406 may include one or more storages 406. Although this disclosure describes and illustrates particular storage, this disclosure contemplates any suitable storage.

In particular embodiments, I/O interface 408 includes hardware, software, or both, providing one or more interfaces for communication between computer system 400 and one or more I/O devices. Computer system 400 may include one or more of these I/O devices, where appropriate. One or more of these I/O devices may enable communication between a person and computer system 400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as, for example, packet-based communication) between computer system 400 and one or more other computer systems 400 or one or more networks. As an example and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it. As an example and not by way of limitation, computer system 400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a Long-Term Evolution (LTE) network, or a 5G network), or other suitable wireless network or a combination of two or more of these. Computer system 400 may include any suitable communication interface 410 for any of these networks, where appropriate. Communication interface 410 may include one or more communication interfaces 410, where appropriate. Although this disclosure describes and illustrates a particular communication interface, this disclosure contemplates any suitable communication interface.

In particular embodiments, bus 412 includes hardware, software, or both coupling components of computer system 400 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The embodiments disclosed herein are only examples, and the scope of this disclosure is not limited to them. Particular embodiments may include all, some, or none of the components, elements, features, functions, operations, or steps of the embodiments disclosed herein. Embodiments according to the disclosure are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

What is claimed is:

1. A service device, comprising:
   one or more processors; and
   one or more computer-readable non-transitory storage media comprising instructions that, when executed by the one or more processors, cause one or more components of the service device to perform operations comprising:
      creating a personal basic service set (PBSS) associated with the service device and one or more 11ay devices, wherein the service device is configured to enable wireless communication with and among the one or more 11ay devices in the PBSS;
      creating a user private network (UPN) associated with at least one access point located outside a coverage area of the PBSS; and
      associating at least one 11ay device of the one or more 11ay devices with the UPN.

2. The service device of claim 1, the operations further comprising generating a list of the one or more 11ay devices that have connected to the PBSS within a time period, wherein the list includes credentials relating to each of the one or more 11ay devices that have connected to the PBSS within the time period.

3. The service device of claim 1, the operations further comprising maintaining a registry of the one or more 11ay devices associated with the PBSS, wherein the registry includes credentials relating to each of the one or more 11ay devices.

4. The service device of claim 1, the operations further comprising:
   identifying a new 11ay device associated with the PBSS;
   updating a first registry of the service device to include the new 11ay device; and
   syncing the first registry with a second registry of a UPN application server.

5. The service device of claim 1, wherein creating the UPN comprises:
   identifying credentials associated with the UPN, wherein the credentials associated with the UPN comprise a name of the UPN;
   connecting to a UPN application server; and
   communicating the credentials associated with the UPN to the UPN application server.

6. The service device of claim 1, wherein the service device connects to the UPN via an 11ax connection or a cellular connection.

7. The service device of claim 1, wherein the at least one 11ay device is configured to establish a first wireless connection with the one or more 11ay devices using the service device when within the coverage area of the PBSS, and to establish a second wireless connection with the one or more 11ay devices using the at least one access point when outside the coverage area of the PBSS.

8. A method, comprising:
   creating a personal basic service set (PBSS) associated with a service device and one or more 11ay devices, wherein the service device is configured to enable wireless communication with and among the one or more 11ay devices in the PBSS;
   creating, via the service device, a user private network (UPN) associated with at least one access point located outside a coverage area of the PBSS; and
   associating at least one 11ay device of the one or more 11ay devices with the UPN.

9. The method of claim 8, further comprising generating a list of the one or more 11ay devices that have connected to the PBSS within a time period, wherein the list includes credentials relating to each of the one or more 11ay devices that have connected to the PBSS within the time period.

10. The method of claim 8, further comprising maintaining a registry of the one or more 11ay devices associated with the PBSS, wherein the registry includes credentials relating to each of the one or more 11ay devices.

11. The method of claim 8, further comprising:
   identifying a new 11ay device associated with the PBSS;
   updating a first registry of the service device to include the new 11ay device; and syncing the first registry with a second registry of a UPN application server.

12. The method of claim 8, wherein creating the UPN comprises:
identifying credentials associated with the UPN, wherein the credentials associated with the UPN comprise a name of the UPN;
connecting to a UPN application server; and
communicating the credentials associated with the UPN to the UPN application server.

13. The method of claim 8, wherein the service device connects to the UPN via an 11ax connection or a cellular connection.

14. The method of claim 8, wherein the at least one 11ay device is configured to establish a first wireless connection with the one or more 11ay devices using the service device when within the coverage area of the PBSS, and to establish a second wireless connection with the one or more 11ay devices using the at least one access point when outside the coverage area of the PBSS.

15. One or more computer-readable non-transitory storage media embodying instructions that, when executed by a processor, cause performance of operations comprising:
creating a personal basic service set (PBSS) associated with a service device and one or more 11ay devices, wherein the service device is configured to enable wireless communication with and among the one or more 11ay devices in the PBSS;
creating, via the service device, a user private network (UPN) associated with at least one access point located outside a coverage area of the PBSS; and
associating at least one 11ay device of the one or more 11ay devices with the UPN.

16. The one or more computer-readable non-transitory storage media of claim 15, the operations further comprising generating a list of the one or more 11ay devices that have connected to the PBSS within a time period, wherein the list includes credentials relating to each of the one or more 11ay devices that have connected to the PBSS within the time period.

17. The one or more computer-readable non-transitory storage media of claim 15, the operations further comprising maintaining a registry of the one or more 11ay devices associated with the PBSS, wherein the registry includes credentials relating to each of the one or more 11ay devices.

18. The one or more computer-readable non-transitory storage media of claim 15, the operations further comprising:
identifying a new 11ay device associated with the PBSS;
updating a first registry of the service device to include the new 11ay device; and
syncing the first registry with a second registry of a UPN application server.

19. The one or more computer-readable non-transitory storage media of claim 15, wherein creating the UPN comprises:
identifying credentials associated with the UPN, wherein the credentials associated with the UPN comprise a name of the UPN;
connecting to a UPN application server; and
communicating the credentials associated with the UPN to the UPN application server.

20. The one or more computer-readable non-transitory storage media of claim 15, wherein the at least one 11ay device is configured to establish a first wireless connection with the one or more 11ay devices using the service device when within the coverage area of the PBSS, and to establish a second wireless connection with the one or more 11ay devices using the at least one access point when outside the coverage area of the PBSS.

\* \* \* \* \*